United States Patent Office 3,296,884
Patented Jan. 10, 1967

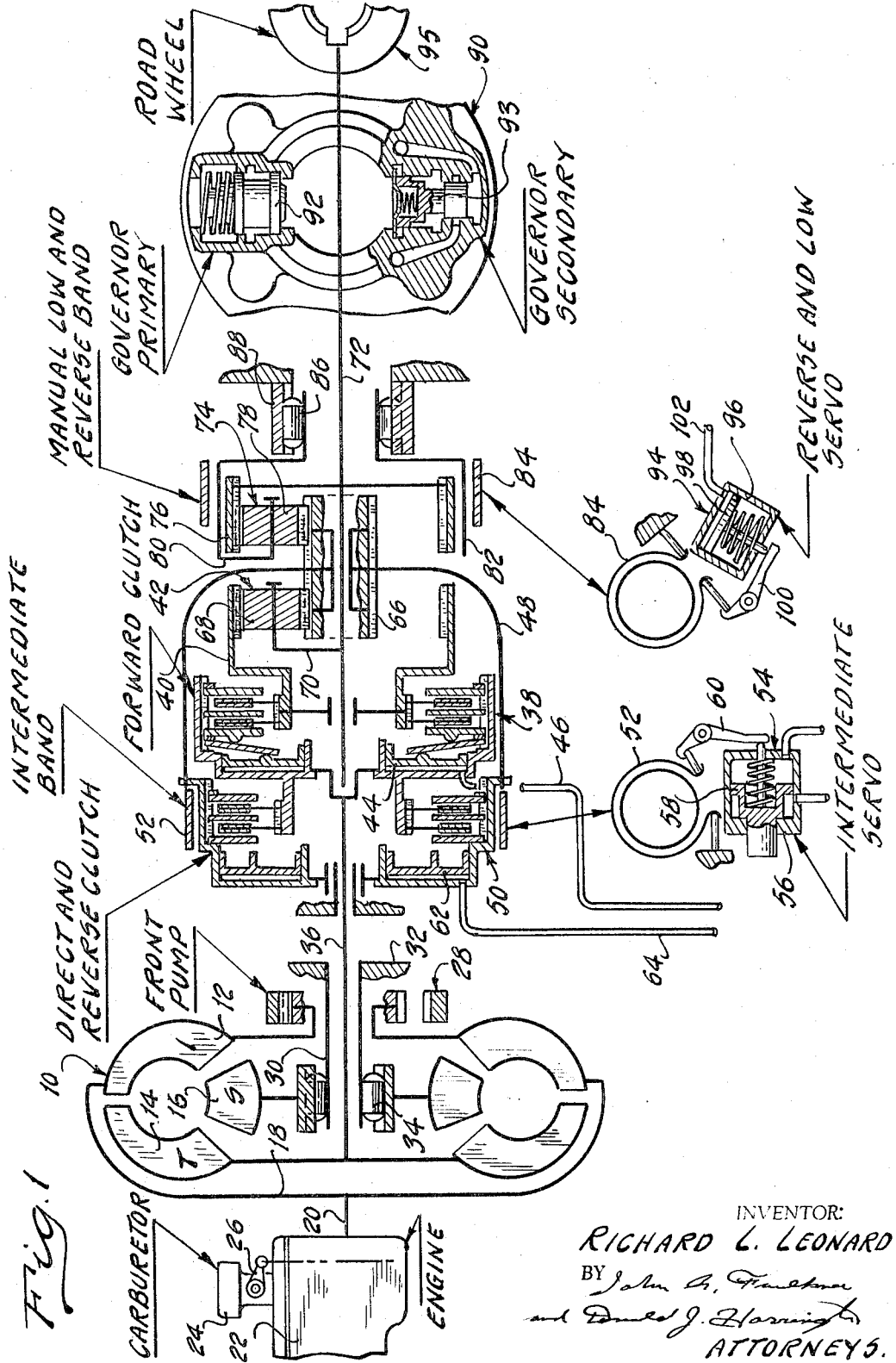

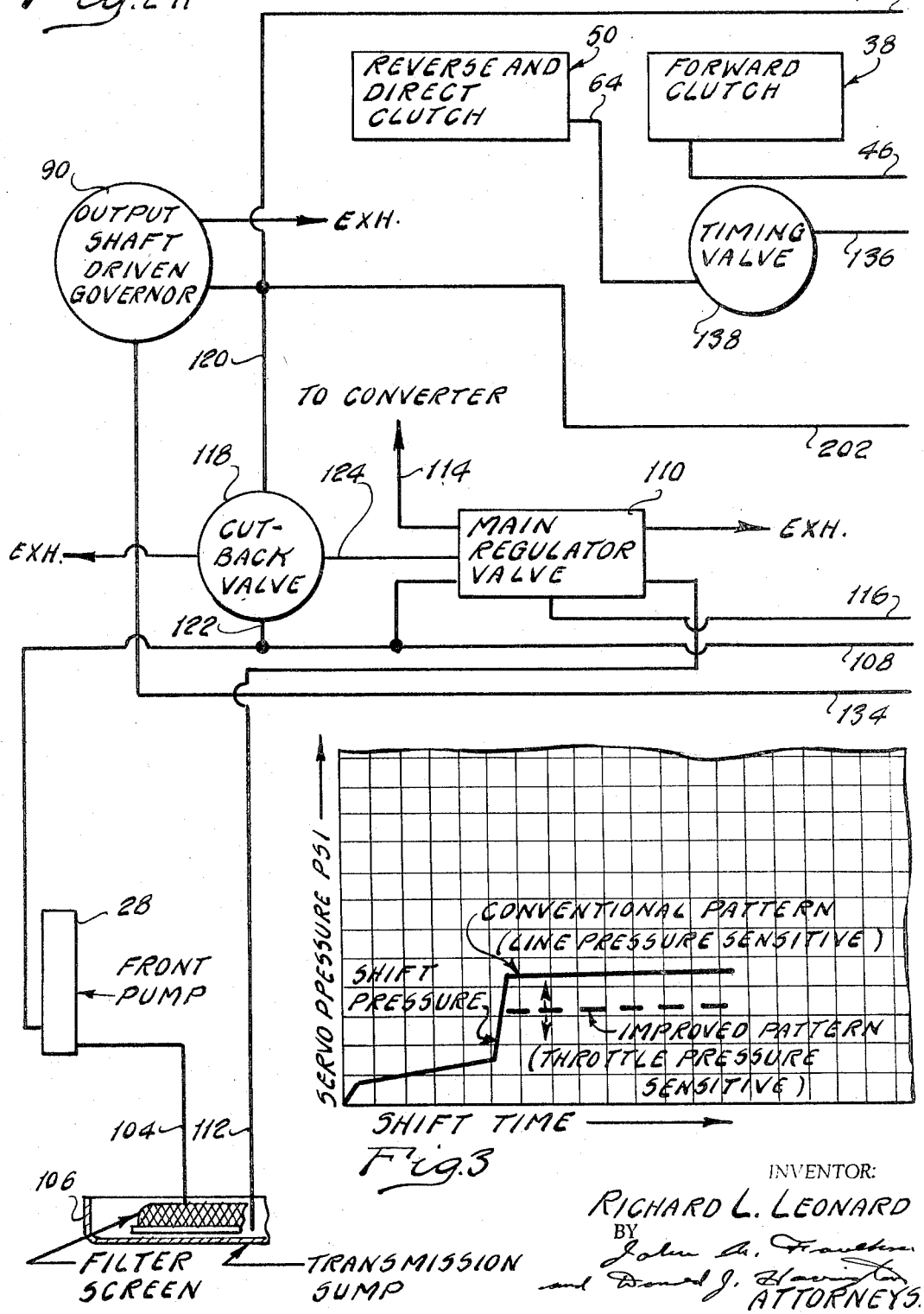

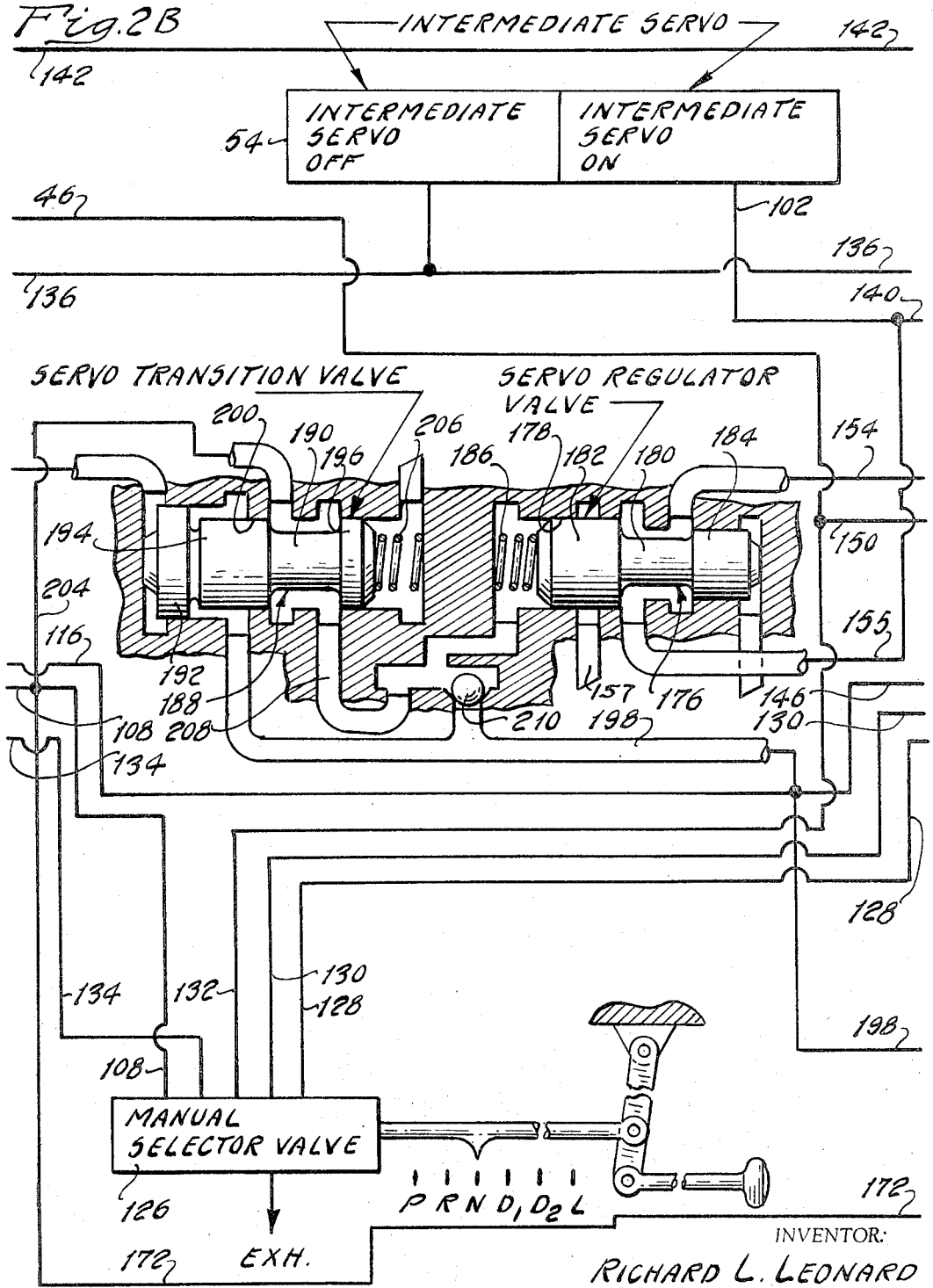

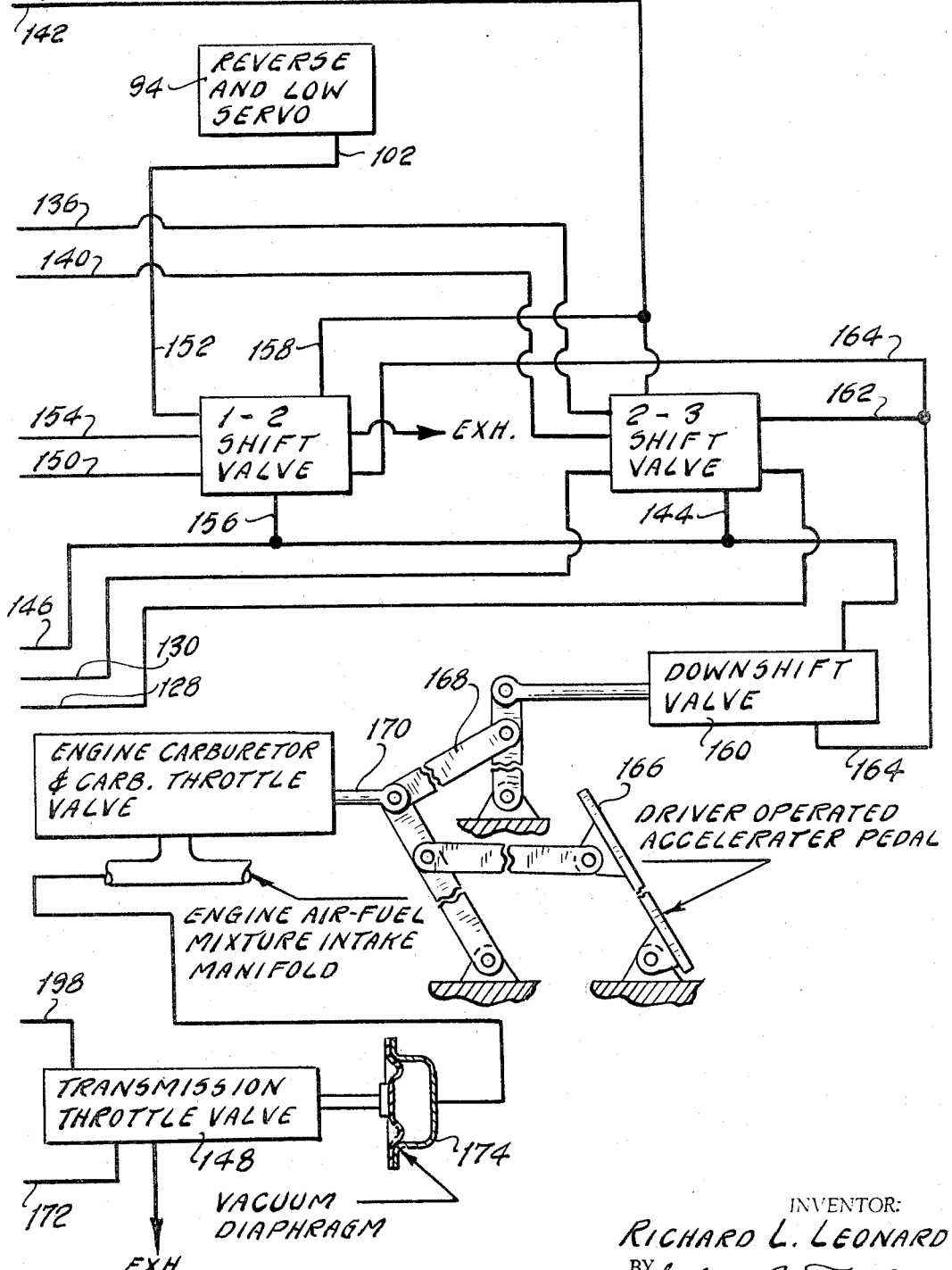

3,296,884
AUTOMATIC CONTROL SYSTEM FOR A MULTIPLE SPEED RATIO POWER TRANSMISSION SYSTEM
Richard L. Leonard, Farmington, Mich., assignor to Ford Motor Company, Dearborn, Mich., a corporation of Delaware
Filed Dec. 3, 1964, Ser. No. 415,666
8 Claims. (Cl. 74—472)

My invention relates generally to automotive vehicle drivelines, and more particularly to a multiple speed ratio power transmission mechanism having a hydrokinetic torque converter and a multiple speed ratio gear system. The improvements of my invention may be embodied in an automatic control valve circuit for controlling the relative motion of gear elements of the gear system to initiate changes in the overall speed ratio of the mechanism so that varying performance requirements can be satisfied.

My invention is capable of being used in automatic control valve systems for automotive vehicle drivelines of known construction. Such mechanisms may include a hydrokinetic torque converter and planetary gearing which establish plural torque delivery paths between an internal combustion vehicle engine and the vehicle traction wheels. The relative motion of the elements of the gearing can be controlled by suitable fluid pressure operated brakes.

During forward drive operation, a shaft driven by the torque converter turbine is connected to a power input element of the gearing by a forward drive clutch. As one brake is applied, a reaction point is established as the system is conditioned for operation in the so-called low speed ratio. To initiate a change from the low speed ratio to an intermediate underdrive ratio, the first brake is released and a second brake is applied as the forward clutch remains applied. The second brake then is capable of establishing a second reaction point for the system.

The servo for operating the second brake includes a double acting piston situated within a cylinder which defines opposed fluid pressure working chambers. When both pressure chambers are applied, the second brake is released. As the released side of the second brake servo is exhausted, however, the pressure on the apply side thereof engages the brake.

To establish direct drive, high speed ratio operation both brakes are released and the direct drive clutch is applied while the forward clutch remains applied. In a preferred embodiment of my invention the brake that is engaged during low speed ratio operation is an overrunning brake. A speed ratio shift is obtained simply by engaging the intermediate speed brake as the overrunning brake begins to freewheel.

In order to improve the quality of the speed ratio shift from the low speed ratio to the intermediate speed ratio, I have made provision for modifying the pressure that is distributed to the apply side of the intermediate speed ratio servo so that it is proportional in magnitude to the torque distributed through the mechanism. Harshness in the shift due to excessive servo capacity for any given driving torque thus is eliminated.

I have accomplished this pressure modification by providing an intermediate servo regulator valve in the servo feed passage. The regulated pressure level maintained by this regulator valve may be varied in response to changes in a control pressure signal that in turn is proportional in magnitude to engine torque.

The provision of an arrangement of the type above set forth being an object of my invention, it is a further object of my invention to provide for use in an automatic, multiple speed ratio, power transmission mechanism a valve system that includes a servo pressure regulator valve and a so-called servo transition valve, the latter being capable of modifying the regulating characteristics of the regulator valve to provide an increased servo capacity to accommodate the multiplied torque of the hydrokinetic torque converter. I contemplate that the influence of the servo transition valve upon the regulator valve will diminish as the speed ratio of the torque converter increases. Thereafter the servo capacity that is maintained is dependent only upon the magnitude of the torque of the engine in the driveline.

Further objects and features of my invention will become apparent from the following description and from the accompanying drawings wherein:

FIGURE 1 shows in schematic form a cross-sectional assembly view of a power transmission mechanism capable of embodying the improvements of my invention;

FIGURES 2A, 2B and 2C show in schematic form a valve system for controlling the relative motion of the gear elements of the mechanism of FIGURE 1; and FIGURE 3 is a chart showing the relationship between the intermediate servo apply pressure and the shift time interval required for a ratio change from a low speed ratio to an intermediate speed ratio.

Referring first to FIGURE 1, a hydrokinetic torque converter unit is identified generally by reference character 10. It includes a bladed impeller 12, a bladed turbine 14 and bladed stator 16. The impeller, the turbine and the stator are situated in the usual fashion in toroidal fluid flow relationship in a common torus circuit. The impeller 12 is connected by means of a drive shell 18 to crankshaft 20 of an internal combustion engine 22. This engine includes an air-fuel mixture intake manifold system having fuel atomizing carburetor 24. Air flow through the carburetor is controlled by a throttle valve having an actuating linkage shown in part at 26.

The impeller is drivably connected to a driving element of a positive displacement front pump 28. Thus the pump 28 is capable of developing a pressure whenever the engine 22 is in operation. The bladed stator 16 is supported by stator sleeve shaft 30 which is secured in known fashion to the transmission housing shown in part at 32. An overrunning brake shown in part at 34 anchors the stator 16 against the shaft 30 and prevents its rotation in a direction opposite to the direction of rotation of the impeller 12, although freewheeling motion in the other direction is permitted.

Turbine 14 is connected drivably to a centrally disposed turbine shaft 36. This shaft is connected by means of a forward clutch 38 to a ring gear 40 for a first planetary gear unit 42. Clutch 38 includes a clutch drum, which carries externally splined clutch discs, and a clutch element which is adapted to carry internally splined clutch discs in interdigital relationship with respect to the externally splined discs. The drum of clutch 38 defines an annular cylinder within which is a slidably disposed annular piston 44. The drum and the piston 44 cooperate to define a clutch pressure working chamber which is supplied with actuating pressure by means of a feed passage 46.

Shaft 36 may be connected selectively to a drive shell 48 by means of a direct and reverse clutch 50. This clutch includes a drum that carries externally splined clutch discs that are situated in interdigital relationship with respect to internally splined clutch discs carried by a companion clutch element, the latter being common to the clutch drum of the clutch 38.

An intermediate speed ratio brake band 52 surrounds the drum of clutch 50. This band 52 can be applied and released by means of an intermediate servo 54, which includes a servo cylinder 56 and a cooperating piston 58.

Fluid pressure in the cylinder 56 and piston 58 cooperate to define a pair of opposed fluid pressure working chambers, each of which is supplied with working pressure through a separate feed passage. The piston 58 can be connected to the working end of the brake band 52 by means of a servo brake band actuating linkage 60, the other end of the band 52 being anchored.

The drum for clutch 50 defines an annular cylinder within which is slidably positioned an annular piston 62. The clutch pressure working chamber defined by the drum for clutch 50 and by the piston 62 is supplied with working pressure through a feed passage 64.

Drive shell 48 is connected to a planetary sun gear 66 which meshes with planet pinions 68. Pinions 68 are rotatably journaled upon a planetary carrier 70, and they mesh with ring gear 40 and sun gear 66. Carrier 70 is is connected drivably to a power output shaft 72.

Sun gear 66 is common to both planetary gear unit 40 and a second planetary gear unit 74. The gear unit 74 includes also a ring gear 76, planet pinions 78 and a planetary carrier 80. Pinions 78 are journaled upon carrier 80 and they mesh with both ring gear 76 and sun gear 66. Carrier 80 defines a brake drum 82 about which is positioned a manual low and reverse brake band 84. Ring gear 76 is connected drivably to shaft 72.

An overrunning brake shown in part at 86 is adapted to anchor carrier 80 against rotation in one direction, but it permits freewheeling motion of the carrier in the other direction. This overrunning brake sets a reaction point for the gearing during operation in the lowest speed ratio, as will be explained subsequently. The outer race 88 of the overrunning brake can be connected to the transmission housing.

Output shaft 72 carries a governor assembly 90. This assembly includes primary governor 92 and a secondary governor 93. They operate in the manner described in copending application Serial No. 277,855, which is assigned to the assignee of my instant invention. Assembly 90 provides a pressure signal that is proportional in magnitude to the driven speed of shaft 72. The signal utilized by the control valve system that will be described with reference to FIGURES 2A, 2B and 2C.

Shaft 72 can be connected through a suitable driveline and differential and axle assembly to road wheels 95.

Brake band 84 can be applied and released by means of a fluid pressure operated servo shown schematically at 94. It includes a cylinder 96 within which is positioned a piston 98. A brake operating linkage 100 connects mechanically the piston 98 to the operating end of the brake band 84, the other end thereof being anchored. The brake servo operating pressure is distributed to the working chamber defined by cylinder 96 and piston 98 through a feed passage 102.

To establish low speed ratio operation, the forward clutch 38 is applied. The turbine torque developed by the torque converter unit 10 is distributed then through shaft 36 and through clutch 38 to the ring gear 40. Since rotation of shaft 72 is resisted, sun gear 66 tends to rotate in a direction opposite to the direction of rotation of shaft 36. This then tends to drive ring gear 76 in a forward driving direction. Since carrier 80 is inhibited from rotating in a direction opposite to the direction of rotation of shaft 36, it may act as a reaction point for the gear system. Thus driving torque can be distributed from ring gear 76 to the power output shaft 72. The forward driving carrier torque of carrier 70 also contributes to the output torque applied to shaft 72. Thus a split torque delivery path through the gearing is provided.

If continuous operation in the low speed ratio is desired or if engine braking is desired, the reverse and low servo can be pressurized thereby applying band 84. The carrier 80 thus can be inhibited from rotating in each direction while the low speed driving ratio through the gearing is maintained.

To establish a speed ratio change from a low speed ratio to an intermediate speed ratio, the brake band 52 is applied by pressurizing the working chamber on the apply side of the intermediate servo. Brake band 84 normally would be released under these conditions. The forward drive clutch is applied, as it is during operation in the forward drive range in any speed ratio. The direct and reverse clutch remains disengaged. Turbine torque then is distributed from shaft 36 through the applied clutch 38 to ring gear 40. Sun gear 66 normally functions as a reaction element since it is anchored upon a brake band 52. Carrier 70 thus drives driven shaft 72 at an increased speed ratio. The overrunning brake shown at part 86 freewheels on these conditions. The rear planetary gear unit 74 performs no function.

To establish direct drive, high speed ratio operation, the brake band 52 is released by pressurizing the release side of the intermediate servo 54. The forward clutch 38 remains applied and the clutch 50 is applied in sequence with the release of brake band 52. Brake band 84, of course, is disengaged since the elements of the gear units are locked together. A 1:1 speed ratio then is established in the gearing.

Reverse drive operation is obtained by releasing the forward clutch 38 and applying the direct and reverse clutch 50. Brake band 52 is released and brake band 84 is applied. Turbine torque then is delivered from shaft 36 through clutch 50 to the drive shell 48. Sun gear 66 thus is driven by the shaft 36. Carrier 80 acts as a reaction member since it is anchored by band 84. Ring gear 76 then is driven in a direction opposite to the direction of rotation of shaft 36, which causes the shaft 72 to rotate in a reverse driving direction at a reduced speed ratio.

Referring next to FIGURES 2A, 2B and 2C, I have illustrated in schematic fashion the principal elements of the control circuit for controlling the operation of the clutch and brake servos of the mechanism of FIGURE 1. The engine driven front pump 28 receives fluid from a supply line 104 which communicates with a transmission sump 106 defined by the lower region of the transmission housing. The discharge side of the pump 28 communicates with a main line pressure passage 108. A branch portion of passage 108 is in communication with a main regulator valve 110. This valve functions to bypass fluid through a flow return line 112, which communicates with the sump. The regulator valve 110 maintains a predetermined pressure level in passage 108. It distributes also a regulated pressure to a torque converter feed passage 114. Regulator valve 110 responds to changes in the magnitude of an engine torque sensitive pressure that is distributed to it through passage 116. Thus as engine torque increases, the magnitude of the pressure level maintained in passage 108 is increased.

A cutback valve 118 responds to a driven shaft speed sensitive pressure signal in passage 120 to distribute line pressure from a branch passage 122 to another branch passage 124, the latter in turn communicating with the regulator valve 110. The cutback valve then is expected to control communication between passage 124 and passage 108 so that at higher vehicle speeds for any given engine throttle setting the regulated pressure level will be lower than it is during operation at lower speeds with that same engine intake manifold pressure. During normal operation, this cutback occurs following initial acceleration from a standing start. When the converter torque ratio is at a relatively low value, it is preferable for the cutback valve to reduce line pressure at a time prior to automatic speed ratio changes as the vehicle accelerates. In this way the various clutch and brake servos can be actuated at a reduced pressure that is more consistent with the torque transmitting requirements that exist during a speed ratio change.

Line pressure passage 108 communicates with a manual selector valve 126. This valve can be adjusted by the vehicle operator to condition the control system for operation in any one of several operating ranges. These are indicated in FIGURE 2B by the symbols, R, N, D1, D2 and L. These symbols identify respectively the positions of the manual selector valve 126 that correspond to Reverse, Neutral, First Drive Range, Second Drive Range and Manual Low Range. The valve 126 is adapted to control distribution of pressure from passage 108 to each of four passages 128, 130, 132 and 134. Communication between each of these passages the exhaust also is controlled by the selector valve.

When the manual selector valve assumes the D1 position, the transmission may accelerate from a standing start in the lowest gear ratio and as the vehicle speed increases for any given engine intake manifold pressure, two upshifts are obtained. On the other hand, if the manual valve is moved to the D2 position, the vehicle will accelerate from a standing start in the intermediate speed ratio rather than in the lowest speed ratio, and only one upshift is available.

If we assume that the manual valve is moved to the D1 position, passage 130 is exhausted and passages 132 and 134 are pressurized. Passage 128 becomes exhausted.

The 2–3 shift valve communicates also with the reverse and direct clutch 50 through a passage 136 which communicates with the passage 64 described previously. If desired, a timing valve 138 can be provided in the passage 136 to control the rate of response of the clutch 50 to shifting movement of the 2–3 shift valve. The valve 138 can be responsive to torque demand or engine torque itself so that the rate of application of the intermediate servo and the rate of release of the clutch 50 can be controlled on a zero throttle 3–2 downshift to establish a controlled degree of overlap, as appropriate, for zero torque delivery. If a corresponding downshift is made under torque with an advance throttle setting, the timing valve responds to provide a different degree of overlap between the clutch disengagement and the brake servo application.

The 2–3 shift valve responds to changes in the vehicle speed sensitive signal produced by governor 90 and to changes in engine intake manifold pressure to control distribution of pressure from passage 130 to passages 136 and also to passage 140, which extends to the apply side of the intermediate servo. Communication between passages 136 and 140 and the exhausted passage 128 also is controlled by the 2–3 shift valve.

The speed sensitive pressure signal is distributed from governor 90 to the 2–3 shift valve through a passage 142. The engine intake manifold pressure sensitive signal is distributed to the 2–3 shift valve through a passage 144, which communicates with a passage 146 that extends to the transmission throttle valve 148. As the magnitude of the pressure signal in passage 142 for any given engine intake manifold pressure increases to a sufficient value, pressure is distributed from passage 130 to passage 136 to effect the release of the intermediate servo and the application of the reverse and direct clutch 50.

Passage 132 communicates also with passage 150, which feeds the 1–2 shift valve with line pressure. This valve controls distribution of pressure from passage 150 to passage 152 and to passage 154, the former extending to the reverse and low servo 94 and latter extending to the servo regulator valve. Communication between these passages and the exhaust region also is controlled by 1–2 shift valve.

The 1–2 shift valve receives engine intake manifold sensitive pressure from passage 146 through passage 156. It receives governor pressure from passage 142 through passage 158. The 1–2 shift valve responds to changes in each of these signal pressures to control speed ratio changes between the low speed ratio and the intermediate speed ratio. The engine intake manifold pressure sensitive signal is distributed to a downshift valve 160 through the passage 146. As the vehicle operator advances the engine carburetor throttle valve setting beyond the wide open position, valve 160 causes the signal pressure in passage 146 to be distributed through passages 162 and 164 to the 2–3 shift valve and the 1–2 shift valve, respectively, thereby causing a forced downshift.

The downshift valve is connected mechanically to the driver-operated accelerator pedal 166 through a servo linkage 168. This linkage includes also a portion 170 that connects mechanically the engine carburetor throttle valve to the accelerator pedal 166. The transmission throttle valve receives line pressure from passage 108 through passage 172. It is actuated in response to movement of the diaphragm that forms a part of a vacuum diaphragm assembly 174. This assembly includes a flexible diaphragm that defines in part a pressure chamber that is in fluid communication with the engine intake manifold. As the manifold pressure increases, the modulated pressure produced by valve 148 increases.

Passage 132, which is pressurized when the manual valve assumes the D1 position, distributes control pressure directly to the forward clutch 38. This, as explained previously, conditions the mechanism for acceleration from a standing start in the lowest speed ratio. Upon an increase in the vehicle speed for any given manifold pressure, the 1–2 shift valve will establish communication between passage 132 and the apply side of the intermediate servo. The release side of the intermediate servo at this time is exhausted through the 2–3 shift valve assembly and the exhausted passage 128. Upon a further increase in vehicle speed for any given manifold pressure, the 2–3 shift valve will assume an upshift position thereby establishing communication between passage 130 and the passage 136. This causes the intermediate servo release side to become pressurized and the clutch 50 to become applied.

It will be apparent from an inspection of FIGURE 2 that the fluid flow path through the 1–2 shift valve that connects passage 132 to the apply side of the intermediate servo is defined in part by the servo regulator valve 176. This valve includes a valve chamber 178 formed in a valve body. A double diameter valve spool 180 slidably positioned within chamber 178 is formed with spaced valve lands 182 and 184. Spool 180 is urged in a right-hand direction by a valve spring 186.

Passage 154 communicates with valve chamber 178 at a location adjacent land 184. Another passage 155 communicates with chamber 178 at a location adjacent land 182. An exhaust port 157 is controlled by land 182. The diameter of land 182 is greater than the diameter of land 184. When the spool 180 assumes the position shown, passage 154 is brought into fluid communication with passage 155.

Disposed in combination with the servo regulator valve is a servo transition valve 188. This valve includes a valve spool 190 having formed thereon valve lands 192, 194 and 196. Land 194 is slightly smaller than land 192. The differential diameter defined by these lands is in fluid communication with throttle pressure passage 146 through a branch throttle pressure passage 198.

Valve spool 190 is slidably disposed within the valve chamber 200. The left-hand end of the valve chamber 200 is in fluid communication with governor pressure passage 142 through a passage 202. Thus the governor pressure produces a force upon the spool 190 which is opposed by the force produced by the signal pressure in passage 198.

Line pressure from passage 108 is distributed to the chamber 200 through a line pressure passage 204. This passage communicates with chamber 200 at a location directly adjacent land 194. Valve spool 190 is urged in a left-hand direction, as viewed in FIGURE 2, by a valve spring 206.

The left-hand end of the valve chamber 178 of the servo regulator valve is in fluid communication with the valve chamber 200 through a passage 208. This passage 208 communicates with chamber 200 at a location directly adjacent land 193. When the pressures in passages 198 and 202 are such that the valve spool 190 will assume the position shown in FIGURE 2, line pressure may be distributed to the left-hand end of the spool 180 through passages 204 and 208. If the valve spool 190 assumes a right-hand position, however, communication between passages 204 and 208 is interrupted.

Throttle pressure passage 198 communicates with passage 208 through a ball check valve 210. Whenever the servo transition valve spool 190 assumes the position shown, the line pressure in passage 208 is greater than the signal pressure in passage 198 and causes the ball check valve to close, thereby interrupting communication between passages 208 and 198. The servo regulator valve then is subjected to line pressure. On the other hand, if the servo transition valve spool 190 assumes a right-hand position, the line pressure is no longer made available to passage 208, and the signal pressure in passage 198 then is sufficient to unseat the ball check valve 210 to permit the left-hand end of valve chamber 178 to become pressurized with engine manifold pressure sensitive pressure signal.

The servo regulator valve will produce a reduced servo apply pressure and the application of the servo then is cushioned for this reason. The servo capacity, however, always remains sufficient to accommodate the required torque since the regulated pressure is allowed to increase as the torque is increased. The magnitude of the torque is measured by the engine manifold pressure signal.

If we assume that the servo transition valve has shifted in a right-hand direction, the spring force of spring 186 is assisted by the manifold pressure signal. This then will cause the servo apply pressure to rise or fall depending upon the magnitude of that signal. This is illustrated in the chart of FIGURE 3 where servo pressure on the apply side of the servo is plotted against shift time during a shift interval. At the instant a shift is initiated, pressure begins to build up in the servo. As the piston strokes, the build-up in pressure is relatively slight. As soon as brake band engagement occurs, however, the accumulation period ceases and the pressure build-up takes place very rapidly until a maximum value is achieved. If the shift occurs at wide open throttle, the pressure will build up to the maximum value illustrated by a horizontal line. At any engine throttle setting less than the maximum, the servo pressure that is achieved will be at a value that is lower than the maximum pressure. This modified pressure is illustrated by dashed horizontal lines in FIGURE 3.

Since the servo capacity that is required depends in part upon the torque ratio that is achieved by the hydrokinetic torque converter, the engine vacuum signal must be supplemented with a signal that senses torque ratio. The transition valve therefore is calibrated so that it will shift in a right-hand direction at a time just prior to attainment of the speed ratio at which the torque converter unit enters the coupling zone. At any speed ratio less than this point, the hydrokinetic unit multiples the engine torque hydrokinetically. This, of course, would require an increased servo capacity. For this reason passage 208 then becomes pressurized so that the servo regulator valve will regulate at a higher sealing value.

The main regulator valve 110 also senses the pressure signal in passage 146. Thus the entire circuit pressure level can be varied in accordance with changes in the power demands of the driveline. The servo regulator valve 176 and servo transition valve 188 provide, however, a reregulation that is demanded by the intermediate servo to produce an optimum quality of 1–2 upshift. The regulating characteristics required for this shift then can be obtained independently of the calibration of the main regulator valve that is necessary to maintain the clutch and brake capacity of the other friction torque establishing devices in the system.

Obviously the presence of the servo regulator valve in the circuit will influence the quality of the 2–3 upshift. The rate of release of the intermediate servo on such a 2–3 upshift would be increased if the servo apply pressure is reduced in the matter described in the foregoing description. For this reason it may be necessary, in order to establish the proper timing between the clutch application and the servo release, to provide the intermediate servo with a reduced area on the intermediate servo release side.

Having thus described a preferred form of my invention, what I claim and desire to secure by U.S. Letters Patent is:

1. In a control valve system for a multiple speed ratio power transmission mechanism comprising a hydrokinetic torque converter and gear elements that cooperate to define a multiple speed ratio torque delivery path between a driving member and a driven member, clutch and brake means for controlling the relative motion of said gear elements to establish selectively said path, including a first brake for anchoring one of said gear elements to establish a relatively low driving speed ratio and a second brake means for anchoring another of said gear elements for establishing a higher speed ratio, a fluid pressure pump driven by rotary portions of said mechanism, fluid pressure operated servos for engaging and releasing said clutch and brake means, conduit structure interconnecting said pump and said servos, fluid pressure distributor valves disposed in and partly defining said conduit structure for selectively controlling distribution of fluid pressure to said servos, main regulator valve means for regulating the magnitude of the pressure made available to said servos, a servo regulator valve means in fluid communication with the servo corresponding to low speed ratio operation for reregulating the pressure made available thereto, a source of a pressure signal that is proportional in magnitude to torque delivered by said mechanism, means for subjecting each regulator valve means to said pressure signal whereby an optimum system pressure is maintained for establishing adequate servo capacity, said servo regulator valve means being adapted to produce an optimum servo pressure for establishing improved shift quality during a speed ratio change, and a servo transition valve means for augmenting the normal regulated pressure level of said servo regulator valve means when said torque converter is effective to multiply the torque delivered through said gear elements.

2. In a control system for a multiple speed ratio power transmission mechanism comprising a hydrokinetic torque converter and gear elements that cooperate to define multiple speed ratios torque delivery paths, driven portions of said converter being connected to power input portions of said gear elements, a power output shaft connected to driven portions of said gear elements, power input portions of said converter being adapted to be connected to an engine, clutch and brake means for controlling the relative motion of said gear elements to establish multiple speed ratios, fluid pressure operated servos for applying and releasing said clutch and brake means automatically, a fluid pressure pump drivably connected to said engine, conduit structure interconnecting said servos and said pump, fluid pressure distributor valve means disposed in and partly defining said conduit structure for controlling distribution of pressure to said servos, one servo being adapted to condition said mechanism for low speed ratio operation and another servo being adapted to condition said mechanism for higher speed ratio operation, a servo regulator valve disposed in portions of said conduit structure that extend to said other servo, a source of a pressure signal that is proportional in magnitude to engine torque, means for distributing said signal to said servo regulator valve to modify the regulating characteristics thereof thereby producing a reduced effective servo pressure in said other servo during a speed ratio change to said higher speed ratio under reduced torque, and a servo transition valve means sensitive to a speed ratio of said torque converter for applying another pressure signal to said servo regulator valve that causes the latter to assume a higher regulated effective pressure in said other servo.

3. In a control valve system for a multiple speed ratio power transmission mechanism comprising a hydrokinetic torque converter and gear elements that cooperate to define a multiple speed ratio torque delivery path between a driving member and a driven member, clutch and brake means for controlling the relative motion of said gear elements to establish selectively said path, including a first brake for anchoring one of said gear elements to establish a relatively low driving speed ratio and a second brake means for anchoring another of said gear elements for establishing a higher speed ratio, a fluid pressure pump driven by rotary portions of said mechanism, fluid pressure operated servos for engaging and releasing said clutch and brake means, conduit structure interconnecting said pump and said servos, fluid pressure distributor valves disposed in and partly defining said conduit structure for selectively controlling distribution of fluid pressure to said servos, main regulator valve means for regulating the magnitude of the pressure made available to said servos, a servo regulator valve means in fluid communication with the servo corresponding to low speed ratio operation for reregulating the pressure made available thereto, a source of a pressure signal that is proportional in magnitude to the torque delivered by said mechanism, means for subjecting each regulator valve means to said pressure signal whereby an optimum system pressure is maintained for establishing adequate servo capacity, said servo regulator valve means being adapted to produce an optimum servo pressure for establishing improved shift quality during a speed ratio change, and a servo transition valve means for augmenting the normal regulated pressure level of said servo regulator valve means when said torque converter is effective to multiply the torque delivered through said gear elements, a servo transition valve means for augmenting the normal regulated pressure level of said servo regulator valve when said torque converter is effective to multiply the torque delivered through said gear elements, said servo transition valve comprising a shiftable valve element communicating with a high pressure portion of said conduit structure, a source of a speed pressure signal that is proportional in magnitude to the driven speed of said driven member, and means for distributing said speed signal to said shiftable valve element, said shiftable valve element thereby being adapted to connect and interrupt communication between said servo regulator valve and said high pressure portion.

4. In a control system for a multiple speed ratio power transmission mechanism comprising a hydrokinetic torque converter and gear elements that cooperate to define multiple speed ratios torque delivery paths, driven portions of said converter being connected to power input portions of said gear elements, a power output shaft connected to driven portions of said gear elements, power input portions of said converter being adapted to be connected to an engine, clutch and brake means for controlling the relative motion of said gear elements to establish multiple speed ratios, fluid pressure operated servos for applying and releasing said clutch and brake means automatically, a fluid pressure pump drivably connected to said engine, conduit structure interconnecting said servos and said pump, fluid pressure distributor valve means disposed in and partly defining said conduit structure for controlling distribution of pressure to said servo, one servo being adapted to condition said mechanism for low speed ratio operation and another servo being adapted to condition said mechanism for higher speed ratio operation, a servo regulator valve disposed in portions of said conduit structure that extend to said other servo, said source of a pressure signal that is proportional in magnitude to engine torque, means for distributing said signal to said servo regulator valve to modify the regulating characteristics thereof thereby producing a reduced effective servo pressure in said other servo during a speed ratio change to said higher speed ratio under reduced torque, a servo transition valve means sensitive to a speed ratio of said torque converter for applying another pressure signal to said servo regulator valve that cause the latter to assume a higher regulated effective pressure in said other servo, said servo transition valve comprising a shiftable valve element communicating with a high pressure portion of said shiftable valve element, a source of a pressure signal is proportional in magnitude to the driven speed of said driven member, and means for distributing said speed signal to said shiftable valve element, said shiftable valve element thereby being adapted to connect and interrupt communication between said servo regulator valve and said high pressure portion.

5. In a control valve system for a multiple speed ratio power transmission mechanism comprising a hydrokinetic torque converter and gear elements that cooperate to define a multiple speed ratio torque delivery path between a driving member and a driven member, clutch and brake means for controlling the relative motion of said gear elements to establish selectively said path, including a first brake for anchoring one of said gear elements to establish a relatively low driving speed ratio and a second brake means for anchoring another of said gear elements for establishing a higher speed ratio, a fluid pressure pump driven by rotary portions of said mechanism, fluid pressure operated servos for engaging and releasing said clutch and brake means, conduit structure interconnecting said pump and said servos, fluid pressure distributor valves disposed in and partly defining said conduit structure for selectively controlling distribution of fluid pressure to said servos, main regulator valve means for regulating the magnitude of the pressure made available to said servos, a servo regulator valve means in fluid communication with the servo corresponding to low speed ratio operation for reregulating the pressure made available thereto, a source of a pressure signal that is proportional in magnitude to the torque delivered by said mechanism, means for subjecting each regulator valve means to said pressure signal whereby an optimum system pressure is maintained for establishing adequate servo capacity, said servo regulator valve means being adapted to produce an optimum servo pressure for establishing improved shift quality during a speed ratio change, and a servo transition valve means for augmenting the normal regulated pressure level of said servo regulator valve means when said torque converter is effective to multiply the torque delivered through said gear elements, a servo transition valve means for augmenting the normal regulated pressure level of said servo regulator valve when said torque converter is effective to multiply the torque delivered through said gear elements, said servo transition valve comprising a shiftable valve element communicating with a high pressure portion of said conduit structure, a source of a speed pressure signal that is proportional in magnitude to the driven speed of said driven member, and means for distributing said speed signal to said shiftable valve element, said shiftable valve element thereby being adapted to connect and interrupt communication between said servo regulator valve and said high pressure portion, a branch passage means providing fluid communication between said transition valve and said servo regulator valve, said transition valve providing direct communication between said branch passage and said high pressure region when it assumes said one position, and a one-way flow check valve means between said branch passage and the source of the torque sensitive signal whereby communication with said servo regulator valve is interrupted as said servo transition valve assumes said one position although such communication is established when said transition valve assumes said other position.

6. In a control system for a multiple speed ratio power transmission mechanism comprising a hydrokinetic torque converter and gear elements that cooperate to define multiple speed ratios, driven portions of said converter being connected to power input portions of said gear elements, a power output shaft connected to said driven portions of said gear elements, power input portions of said converter being adaptively connected to an engine, clutch and brake means for controlling the relative motion of said gear elements to establish multiple speed ratios, fluid pressure operated servos for applying and releasing said clutch and brake means automatically, a fluid pressure pump drivably connected to said engine, conduit structure interconnecting said servos and said pump, fluid pressure distributor valve means disposed in and partly defining said conduit structure for controlling distribution of pressure to said servos, a servo being adapted to condition said mechanism for low speed ratio operation another servo being adapted to condition said mechanism for a higher speed ratio, the servo regulator valve disposed in portions of said conduit structure that extend to said other servo, a source of a pressure signal that is proportional in magnitude to the engine torque, means for distributing said signal to said servo regulator valve to modify the regulating characteristics thereof thereby producing a reduced effective servo pressure in said other servo during a speed ratio change to said higher speed ratio under reduced torque and a servo transition valve means sensitive to a speed ratio of said torque converter for applying another pressure signal to said servo regulator valve that causes the latter to assume the higher regulated effective pressure in said other servo, said servo transition valve comprising a shiftable valve element communicating with a high pressure portion of said shiftable valve element, a source of a pressure signal has a branch passage means providing fluid communication between said transition valve and said servo regulator valve, said transition valve providing direct communication between said branch passage and said high pressure region when it assumes said one position, and a one-way flow check valve means between said branch passage and the source of the torque sensitive signal whereby communication with said servo regulator valve is interrupted as said servo transition valve assumes said one position although such communication is established when said transition valve assumes said other position.

7. In a control valve system for a multiple speed ratio power transmission mechanism comprising a hydrokinetic torque converter and gear elements that cooperate to define a multiple speed ratio torque delivery path between an internal combustion engine and a driven member, said engine having an air-fuel mixture intake manifold, clutch and brake means for controlling the relative motion of said gear elements to establish selectively said path, including a first brake for anchoring one of said gear elements to establish a relatively low driving speed ratio and a second brake means for anchoring another of said gear elements for establishing a higher speed ratio, a fluid pressure pump driven by rotary portions of said mechanism, fluid pressure operated servos for engaging and releasing said clutch and brake means, conduit structure interconnecting said pump and said servos, fluid pressure distributor valves disposed in and partly defining said conduit structure for selectively controlling distribution of fluid pressure to said servos, main regulator valve means for regulating the magnitude of the pressure made available to said servos, a servo regulator valve means in fluid communication with the servo corresponding to low speed ratio operation for reregulating the pressure made available thereto, a source of a pressure signal that is proportional in magnitude to intake manifold pressure, means for subjecting each regulator valve means to said pressure signal whereby an optimum system pressure is maintained for establishing adequate servo capacity, said servo regulator valve means being adapted to produce an optimum servo pressure for establishing improved shift quality during a speed ratio change, and a servo transition valve means for augmenting the normal regulated pressure level of said servo regulator valve means when said torque converter is effective to multiply the torque delivered through said gear elements.

8. In a control system for a multiple speed ratio power transmission mechanism comprising a hydrokinetic torque converter and gear elements that cooperate to define multiple speed ratios torque delivery paths, driven portions of said converter being connected to power input portions of said gear elements, a power output shaft connected to driven portions of said gear elements, power input portions of said converter being adapted to be connected to an internal combustion engine, said engine having an air-fuel mixture intake manifold, clutch and brake means for controlling the relative motion of said gear elements to establish multiple speed ratios, fluid pressure operated servos for applying and releasing said clutch and brake means automatically, a fluid pressure pump drivably connected to said engine, conduit structure interconnecting said servos and said pump, fluid pressure distributor valve means disposed in and partly defining said conduit structure for controlling distribution of pressure to said servos, one servo being adapted to condition said mechanism for low speed ratio operation and another servo being adapted to condition said mechanism for higher speed ratio operation, a servo regulator valve disposed in portions of said conduit structure that extend to said other servo, a source of a pressure signal that is proportional in magnitude to manifold pressure, means for distributing said signal to said servo regulator valve to modify the regulating characteristics thereof thereby producing a reduced effective servo pressure in said other servo during a speed ratio change to said higher speed ratio under reduced manifold pressure, and a servo transition valve means sensitive to a speed ratio of said torque converter for applying another pressure signal to said servo regulator valve that causes the latter to assume a higher regulated effective pressure in said other servo.

References Cited by the Examiner
UNITED STATES PATENTS

| | | | |
|---|---|---|---|
| 2,770,148 | 11/1956 | Wayman | 74—472 |
| 2,824,632 | 2/1958 | Lucia et al. | 192—3.2 |
| 3,004,446 | 10/1961 | Flinn | 74—472 |
| 3,004,447 | 10/1961 | Sand | 74—472 |
| 3,023,632 | 3/1962 | Flinn | 74—472 |

DAVID J. WILLIAMOWSKY, *Primary Examiner.*

J. R. BENEFIEL, *Assistant Examiner.*